(12) United States Patent
Essawi et al.

(10) Patent No.: US 8,719,232 B2
(45) Date of Patent: May 6, 2014

(54) SYSTEMS AND METHODS FOR DATA INTEGRITY CHECKING

(75) Inventors: Tarik Essawi, Leesburg, VA (US);
Deepak Deshpande, Herndon, VA (US);
Niraj Tank, Ashburn, VA (US)

(73) Assignee: Verisign, Inc., Reston, VA (US)

( * ) Notice: Subject to any disclaimer, the term of this patent is extended or adjusted under 35 U.S.C. 154(b) by 144 days.

(21) Appl. No.: 13/174,347

(22) Filed: Jun. 30, 2011

(65) Prior Publication Data

US 2013/0006949 A1   Jan. 3, 2013

(51) Int. Cl.
*G06F 7/00* (2006.01)
*G06F 17/00* (2006.01)

(52) U.S. Cl.
USPC ............ 707/687; 707/690; 707/691; 707/703

(58) Field of Classification Search
USPC .................. 707/687, 690, 691, 703, 999.202, 707/999.204
See application file for complete search history.

(56) References Cited

U.S. PATENT DOCUMENTS

| | | | |
|---|---|---|---|
| 6,052,695 A | 4/2000 | Abe et al. | |
| 6,163,856 A * | 12/2000 | Dion et al. | 714/4.11 |
| 6,385,444 B1 | 5/2002 | Peschel et al. | |
| 7,506,195 B2 * | 3/2009 | Takahashi et al. | 714/4.4 |
| 7,599,939 B2 | 10/2009 | DeStefano et al. | |
| 8,266,101 B1 * | 9/2012 | Shuai | 707/610 |
| 2002/0116404 A1 * | 8/2002 | Cha et al. | 707/202 |
| 2005/0097149 A1 | 5/2005 | Vaitzblit et al. | |
| 2006/0015458 A1 | 1/2006 | Teicher | |
| 2006/0064598 A1 * | 3/2006 | Higashikado et al. | 713/182 |
| 2006/0271557 A1 * | 11/2006 | Harward et al. | 707/10 |
| 2007/0156546 A1 * | 7/2007 | Oppert et al. | 705/30 |
| 2008/0228834 A1 | 9/2008 | Burchall et al. | |
| 2008/0294898 A1 * | 11/2008 | D'Athis et al. | 713/169 |
| 2010/0005124 A1 | 1/2010 | Wagner | |
| 2010/0191713 A1 * | 7/2010 | Lomet et al. | 707/704 |
| 2010/0318858 A1 * | 12/2010 | Essawi et al. | 714/49 |
| 2011/0047413 A1 * | 2/2011 | McGill et al. | 714/15 |
| 2011/0258164 A1 * | 10/2011 | Mandagere et al. | 707/685 |
| 2012/0310880 A1 * | 12/2012 | Giampaolo et al. | 707/610 |

OTHER PUBLICATIONS

Extended European Search Report, issued from the European Patent Office, dated Nov. 22, 2012, in corresponding European Patent Application No. 12174249.8, 6 pages.

* cited by examiner

*Primary Examiner* — Hares Jami
(74) *Attorney, Agent, or Firm* — MH2 Technology Law Group

(57) ABSTRACT

Systems and methods are provided for data integrity checking in a computing system. In one exemplary embodiment, the method includes receiving, from each of a plurality of computing devices of the computing system, application transaction logs, wherein the application transaction logs are related to a plurality of applications. The method also includes comparing, by the central computing device, the received application transaction logs to a transactions recorded in a database to identify missing transactions. In addition, the method includes performing one or more actions in response to the identified missing transactions.

14 Claims, 8 Drawing Sheets

```
500              500              400
499              499              500
 .                .                .
 .                .                .
401              401              401
400              399       ⎫      399
399               .        ⎬ Off by  .        ⎫ Off by
 .                .        ⎭  100    .        ⎬ 100 up
 .                .          down    .        ⎭
301              300              301
300              400              300
```

FIG. 7a  FIG. 7b  FIG. 7c

SYSTEMS AND METHODS FOR DATA INTEGRITY CHECKING

TECHNICAL FIELD

The present disclosure generally relates to systems and methods for data checking, and, more particularly, to systems and methods for improved data integrity checking in distributed computing system.

BACKGROUND

In a distributed computing system, multiple independent computing devices may be configured to communicate with one another through a computer network. Typically, the communications occur in the form of messages. The messages may be sent from computing devices in the distributed computing system to a central computing device, and the central computing device may act on the messages. For example, the message may be an instruction to write data to a database in the distributed computing system.

Each discrete message and the steps associated with its processing may be referred to as a transaction. Records of a transaction may be stored both in a transaction log of the computing device from which the message originates, as well as written to a database. Typically, when the records in a transaction log are the same as the transactions recorded in the database, the data is determined to be consistent and correct. However, when the records in a transaction log are different from the transactions recorded in the database, it may signify that the data in the database is compromised. The data in a database may be compromised when, for example, a system failure occurs before a transaction is complete.

A lack of integrity of the data stored in the data center database may cause inaccuracies and inconsistencies in the data that can be perpetuated throughout the distributed computing system. In addition, the database may be corrupted such that the data is unrecoverable or unusable.

The disclosed embodiments address one or more of the problems set forth above.

SUMMARY

In one exemplary embodiment, the present disclosure is directed to a method for data integrity checking in a computing system, the method comprising: receiving, from each of a plurality of computing devices of the computing system, application transaction logs, wherein the application transaction logs are related to a plurality of applications; comparing, by the central computing device, the received application transaction logs to a transactions recorded in a database to identify missing transactions; and performing one or more actions in response to the identified missing transactions.

In another exemplary embodiment, the present disclosure is directed to a computing system for data integrity checking, the system comprising: at least one memory to store data and instructions; and at least one processor configured to access the at least one memory and, when executing the instructions, to: receive, from each of a plurality of computing devices of the computing system, application transaction logs, wherein the application transaction logs are related to a plurality of applications; compare, by the central computing device, the received application transaction logs to transactions recorded in a database to identify missing transactions; and perform one or more actions in response to the identified missing transactions.

In another exemplary embodiment, the present disclosure is directed to a method for data integrity checking in a computing system, the method comprising: receiving, from each of a plurality of computing devices of the computing system, application transaction logs, wherein the application transaction logs are related to a plurality of applications; aggregating, by the central computing device, the received application transaction logs to generate aggregated transaction logs; reading, by the central computing device, transactions recorded in a database; comparing, by the central computing device, the aggregated transaction logs to the transactions recorded in the database to identify one or more missing transactions.

BRIEF DESCRIPTION OF THE DRAWINGS

The accompanying drawings, which are incorporated in and constitute a part of this disclosure, illustrate aspects consistent with the present disclosure and, together with the description, serve to explain advantages and principles of the present disclosure. In the drawings:

FIG. 7a illustrates an example of log data in a computing system that performs data integrity checking, consistent with certain disclosed embodiments;

FIG. 7b illustrates an example of log data in a computing system that performs data integrity checking, consistent with certain disclosed embodiments;

FIG. 7c illustrates an example of log data in a computing system that performs data integrity checking, consistent with certain disclosed embodiments;

DETAILED DESCRIPTION

Figure 1:
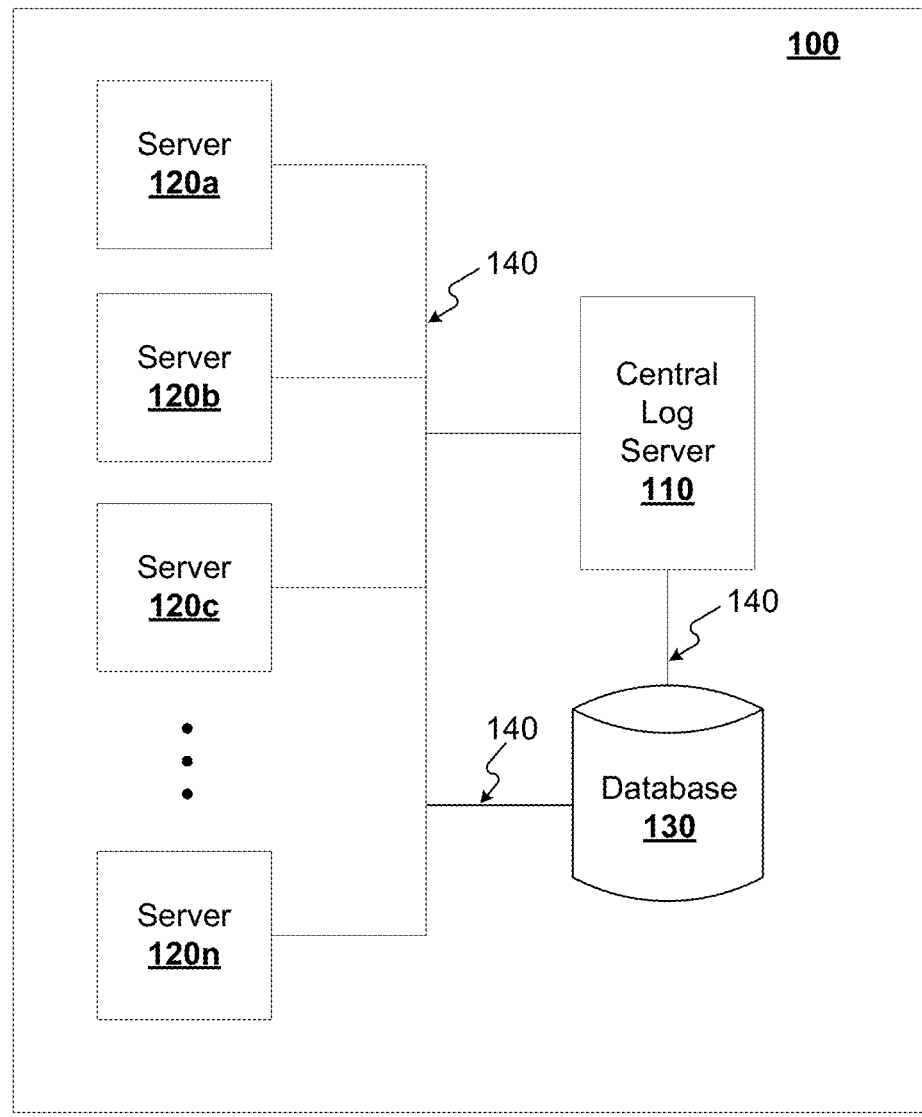
FIG. 1 illustrates an example computing system in which data integrity checking may be performed, consistent with certain disclosed embodiments.

The prevalence of distributed processing and the effort to persist application data to databases has led to the development of data integrity checking processes. The disclosed data integrity checking processes may be executed on one or more computing devices in one or more computing systems. When a critical component fails and the computing system crashes, the system recovery process may include one or more of the disclosed processes for checking the integrity of the data.

It is to be understood that both the foregoing general description and the following detailed description are exemplary and explanatory only and are not restrictive of the disclosure, as claimed.

The following detailed description refers to the accompanying drawings. Wherever possible, the same reference numbers will be used throughout the drawings and the following description to refer to the same or like parts. While several exemplary embodiments and features are described herein, modifications, adaptations and other implementations are possible, without departing from the spirit and scope of the disclosure. For example, substitutions, additions or modifications may be made to the components illustrated in the drawings, and the exemplary methods described herein may be modified by substituting, reordering or adding steps to the disclosed methods. Accordingly, the following detailed description does not limit the disclosure.

FIG. 1 is a block diagram of an example computing system 100 in which systems and methods consistent with the present disclosure may be implemented. Specifically, FIG. 1 illustrates an example computing system 100 that allows data integrity checking in a distributed computing environment. In some embodiments, computing system 100 may be a domain name registry data center configured to include one or more autonomous servers and operate a domain name registry service. A domain name registry service may include, for example, a database of all domain names registered in a top-level domain. In FIG. 1, computing system 100 may include a central log server 110, one or more servers 120 (e.g., server 120a, server 120b, and server 120c through server 120n), database 130, and communication links 140.

Central log server 110 may be a computing device configured to process transactions, perform data integrity checking, and perform one or more actions in response to the results of data integrity checking. For example, central log server 110 may be configured to receive messages from servers 120 via communications links 140, and perform one or more tasks associated with the received messages In addition, central log server 110 may be configured to collect transaction logs from servers 120, aggregate the transaction logs, sort the data records in the aggregated transaction logs, and compare the data records in the aggregated transaction logs with the transactions recorded in database 130 and/or a database log.

Figure 2:
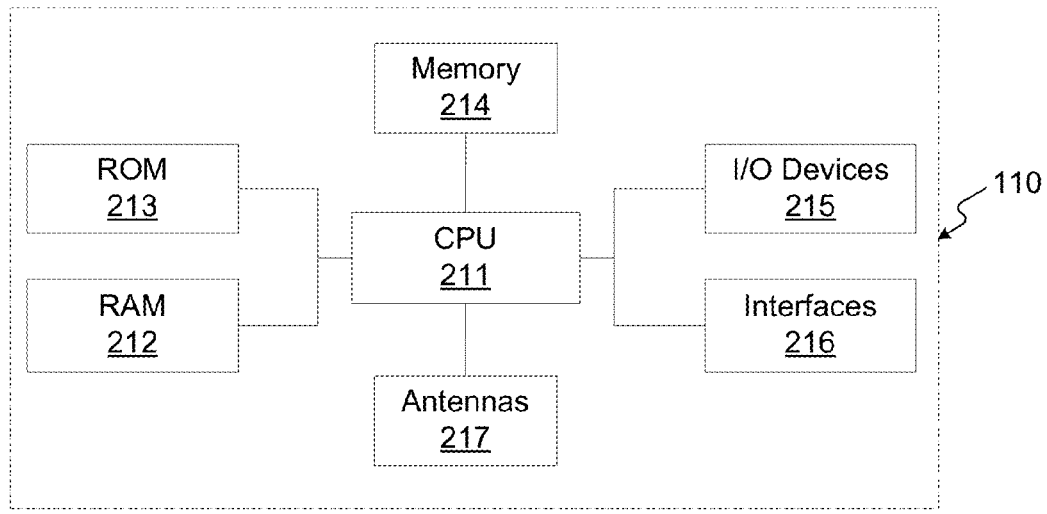
FIG. 2 illustrates an example computing device for performing data integrity checking, consistent with certain disclosed embodiments.

FIG. 2 is a block diagram of an exemplary central log server 110, consistent with certain disclosed embodiments. As shown in FIG. 2, central log server 110 may include one or more of the following components: a central processing unit (CPU) 211 configured to execute computer program instructions to perform various processes and methods; random access memory (RAM) 212 and read only memory (ROM) 213 configured to access and store information and computer program instructions; memory 214 to store data and information; I/O devices 215; interfaces 216; antennas 217; etc. Each of these components is well-known in the art and will not be discussed further. The components of central log server 110 may be in connection and/or communication with one another via any type of communications link, wired and/or wireless, many of which are also known in the art.

Each of servers 120 may be a computing device configured to initiate transactions, and record them in the database 130 and generate log files. For example, each server 120 may be configured to transmit messages to central log server 110 via communications links 140, and store a record of the transmitted messages in one or more transaction logs. In addition, servers 120 may each be configured to transmit transaction logs to central log server 110, either upon request or automatically following a system failure or at a predetermined time or event. In some embodiments, each of servers 120 may be associated with a distinct process and/or application, and the transaction logs for each server 120 may store data records associated with the distinct process and/or application.

Figure 3:
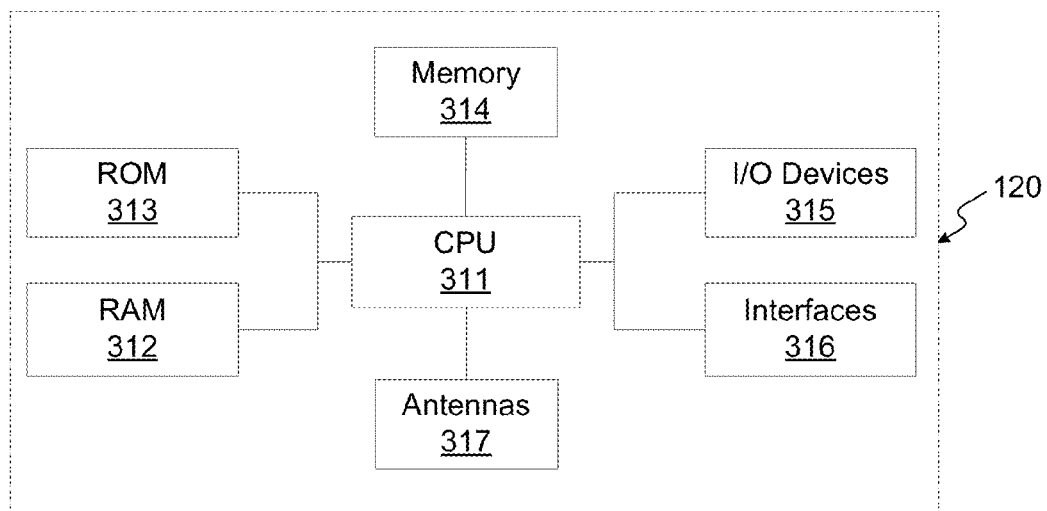
FIG. 3 illustrates an example computing device, consistent with certain disclosed embodiments.

FIG. 3 is a block diagram of an exemplary server 120, consistent with certain disclosed embodiments. As shown in FIG. 3, server 120 may include one or more of the following components: a central processing unit (CPU) 311 configured to execute computer program instructions to perform various processes and methods; random access memory (RAM) 312 and read only memory (ROM) 313 configured to access and store information and computer program instructions; memory 314 to store data and information; I/O devices 315; interfaces 316; antennas 317; etc. Each of these components is well-known in the art and will not be discussed further. The components of server 120 may be in connection and/or communication with one another via any type of communications link, wired and/or wireless, many of which are also known in the art.

Database 130 may be any combination of hardware and/or software components configured to store, organize, and permit access to data. In one implementation, database 130 may be a software database program configured to store data associated with servers 120 and their associated applications 422 or processes (not shown), such as, for example, a standard database or a relational database. In one embodiment, the software database program operating on central log server 110 may be a relationship database management system (RDBMS) that may be configured to run as a server on central log server 110, such as, for example, an Oracle database, a MySQL database, a DB2 database, etc.

Communication links 140 may be any appropriate network or other communication link that allows communication between or among one or more computing systems and/or devices, such as, for example, computing system 100, central log server 110, servers 120, and database 130. Communication links 140 may be wired, wireless, or any combination thereof. Communication links 140 may include, for example, the Internet, a local area network, a wide area network, a WiFi network, a workstation peer-to-peer network, a direct link network, a Bluetooth connection, a bus, or any other suitable communication network.

Figure 4:
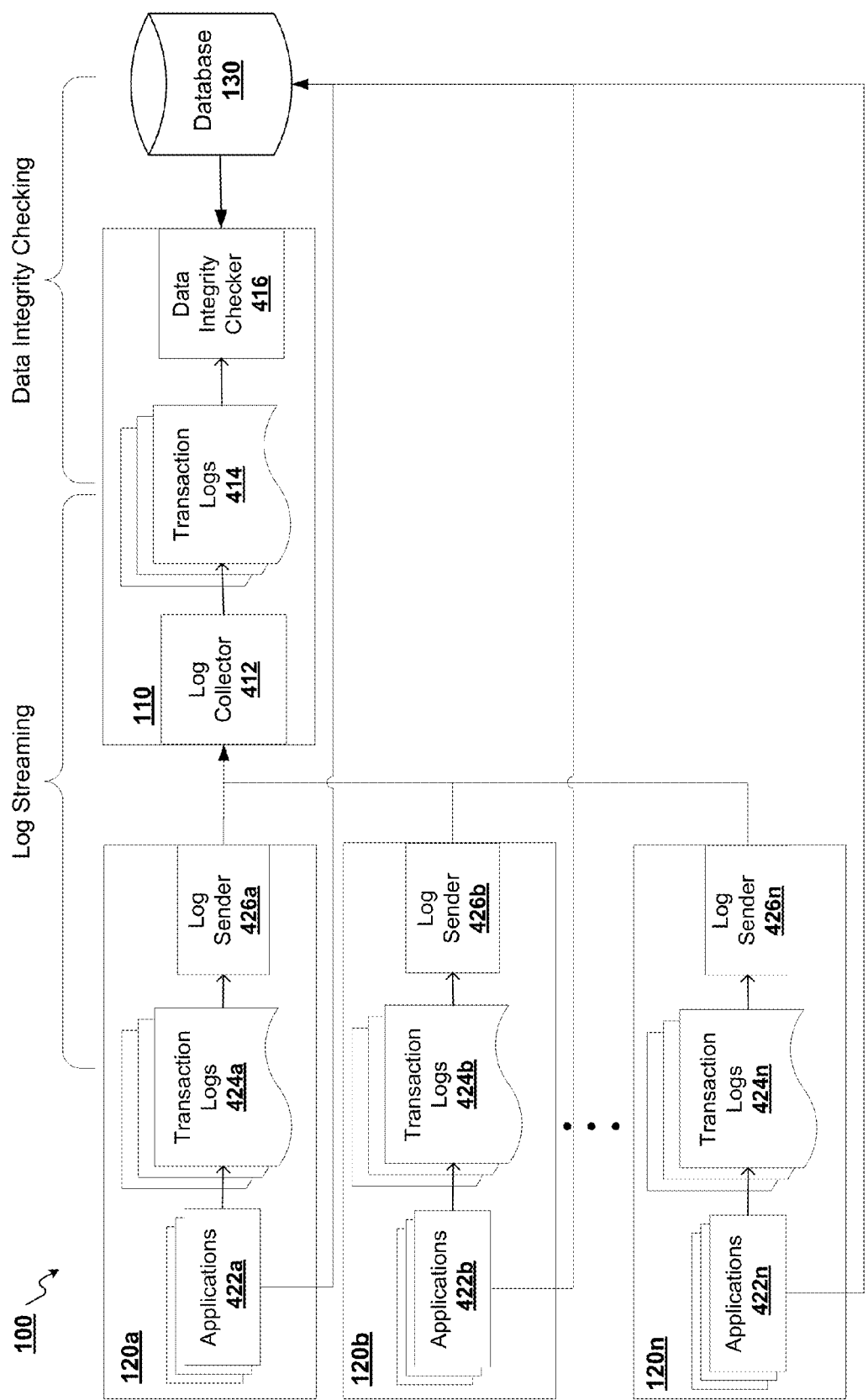
FIG. 4 illustrates an example of software components of the example computing system of FIG. 1 in which data integrity checking may be performed, consistent with certain disclosed embodiments.

FIG. 4 is a block diagram illustrating exemplary software components of computing system 100, consistent with certain disclosed embodiments. As shown in FIG. 4, central log server 110 may include three logical components: log collector 412, aggregated transaction logs 414, and data integrity checker 416. In addition, each of servers 120 may include three logical components: applications 422 (e.g., server 120a may include application 422a, server 120b may include application 422b through server 120n which may include application 42211), transaction logs 424 (e.g., server 120a may include transaction log 424a, server 120b may include transaction log 424b through server 120n which may include transaction log 424n), and log senders 426 (e.g., server 120a which may include log sender 426a, server 120b which may include log sender 426b through server 120n which may include log sender 426n).

Transaction logs 424, log senders 426, log collector 412, and aggregated transaction logs 414 may be used to perform log streaming Log streaming may include transferring transaction logs 424 to central log server 110 from all possible transaction log sources, e.g., server 120a through server 120n, in near real-time. In one example embodiment, log senders 426 may be installed on each server 120 where transaction logs 424 are being generated, and log senders 426 may be configured to send transaction logs 424 to log collector 412. In some embodiments, log senders 426 may send transaction logs 424 upon receiving a request for transaction logs 424 from central log server 110. In other embodiments, log senders 426 may send transaction logs 424 at certain, predetermined times (e.g., hourly, daily, weekly, monthly, etc.) or following certain, predetermined events (e.g., detection of a system failure, detection or determination of a data loss event, etc.).

Log collector 412 may be installed on central log server 110. Log collector 412 may be configured to send requests for transactions logs 424 to servers 120, i.e., "pull" transaction logs 424 to central log server 110. Additionally and/or alternatively, log collector 412 may be configured to receive transactions logs 424 wherein transmission has been initiated by servers 120, i.e., "push" transaction logs 424 to central log server 110. In some embodiments, log sender 426 may send requests for transaction logs 424 at certain, predetermined times (e.g., hourly, daily, weekly, monthly, etc.) or following certain, predetermined events (e.g., detection of a system failure, detection or determination of a data loss event, etc.). Each of log senders 426 may receive the request for transaction logs 424 and, in turn, send their respective transaction logs 424 to log collector 412 of central log server 110. That is, log sender 426a of server 120a may receive the request from central log server 110, and send transaction logs 424a to collector 412. Similarly, log sender 426b of server 120b and log sender 426n of server 120n may each receive the request from central log server 110, and send transaction logs 424b and 424n, respectively, to collector 412. In some embodiments, each of log senders 426 may send only a certain number of transactions to log collector 412. For example, each of log senders 426 may send the most recent 100 transactions from each of transaction logs 424 to log collector 412.

Upon receiving transaction logs 424, whether via push and/or pull technology, log collector 412 may also be configured to write the received transaction logs 424 to a local file system, aggregate transaction logs 424 to generate aggregated transaction logs 414, identify and/or remove duplicate records within or among transaction logs 424, and provide information from aggregated transaction logs 414 to data integrity checker 416.

Aggregated transaction logs 414, data integrity checker 416, and database 130 may be used to perform data integrity checking. Data integrity checking may be the process that verifies the data of aggregated transaction logs 414 against the data of database 130 to identify any data losses. Data integrity checker 416 may operate in two modes: "during outage" mode and "after outage" mode. When operating in "during outage" mode, data integrity checking may be performed during an outage and after recovery of database 130, but before allowing computing system 100 to receive traffic. When operating in "after outage" mode, data integrity checking may be performed after an outage has occurred and database 130 has been recovered, and after computing system 100 is open to traffic. In one embodiment, data integrity checker 416 may operate in "after outage" mode when a data loss is detected in aggregated transaction logs 414 in a "during outage" data integrity check.

Data integrity checker 416 may use one or more parameters to perform data integrity checking in "during outage" and "after outage" modes. For example, when operating in "during outage" mode, data integrity checker 416 may use an outage start time parameter. When operating in after outage mode, data integrity checker 416 may use both an outage start time parameter and an outage end time parameter. The outage start time parameter may be used to identify the start time of an outage, and may include a year, a month, a date, an hour, a minute, and a second of the outage start time. The outage end time may be used to identify the end time of an outage, and may also include a year, a month, a date, an hour, a minute, and a second of the outage end time. In one implementation, the outage start time and the outage end time may each have a format equal to "YYYY-MM-DD HH:MI:SS."

Although FIG. 4 illustrates an embodiment of a single computing system, such as, for example, a single data center, multiple computing systems such as those illustrated in FIG. 4 may be operated in parallel and/or may serve as redundant data centers. In an embodiment where another computing system operates as a redundant computing system, log sender 426 of one data center may be configured to send transaction logs 424 to multiple log collectors 412 in the same data center, as well as to log collectors in other data centers. That is, log senders 426 may always be running on all log sources (e.g., servers 120) in each data center. Similarly, log collectors 412 may be running on central log servers 110 in each data center. In such an embodiment, log sender 426 may be configured to replicate transaction logs 424 originating from one data center and send the replicated transaction logs 424 to one or more other data centers.

Figure 5:
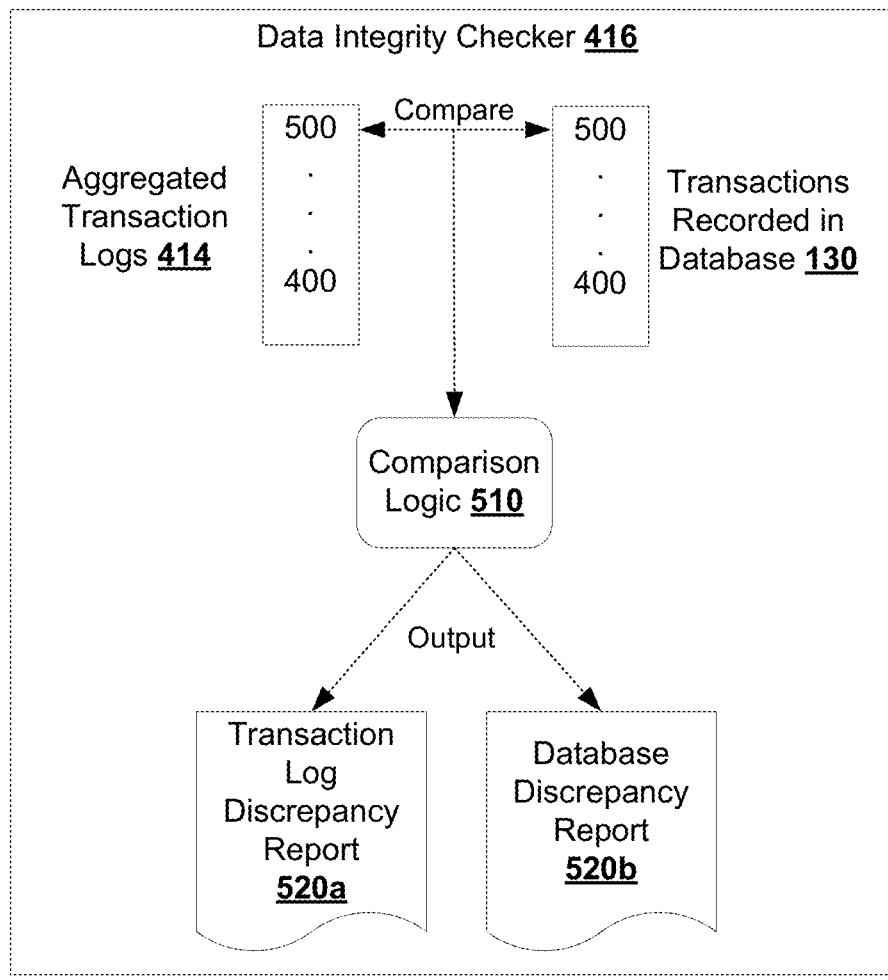
FIG. 5 illustrates an example of a data integrity checker, consistent with certain disclosed embodiments.

FIG. 5 is an illustration of functional block diagram of data integrity checking that may be performed by data integrity checker 416. As shown in FIG. 5, data integrity checker 416 may compare the data records in aggregated transaction logs 414 against the transactions recorded in database 130 using comparison logic 510. The results of the comparison by comparison logic 510 may be output to one or more discrepancy reports 520, e.g., transaction log discrepancy report 520a, database discrepancy report 520b, etc. In one exemplary embodiment, transaction log discrepancy report 520a may be used to list and/or report transactions that are missing from transaction logs 424 and/or aggregated transaction log 414, and database discrepancy report 520b may be used to list and/or report transactions that are missing from database 130. In some embodiments, database discrepancy report 520b may be used to list and/or report transactions that are missing from a database log(not shown). Although not shown, a single discrepancy report 520 may be used to list and/or report transactions that are missing from transaction logs 424 and/or missing from database 130.

Figure 6:
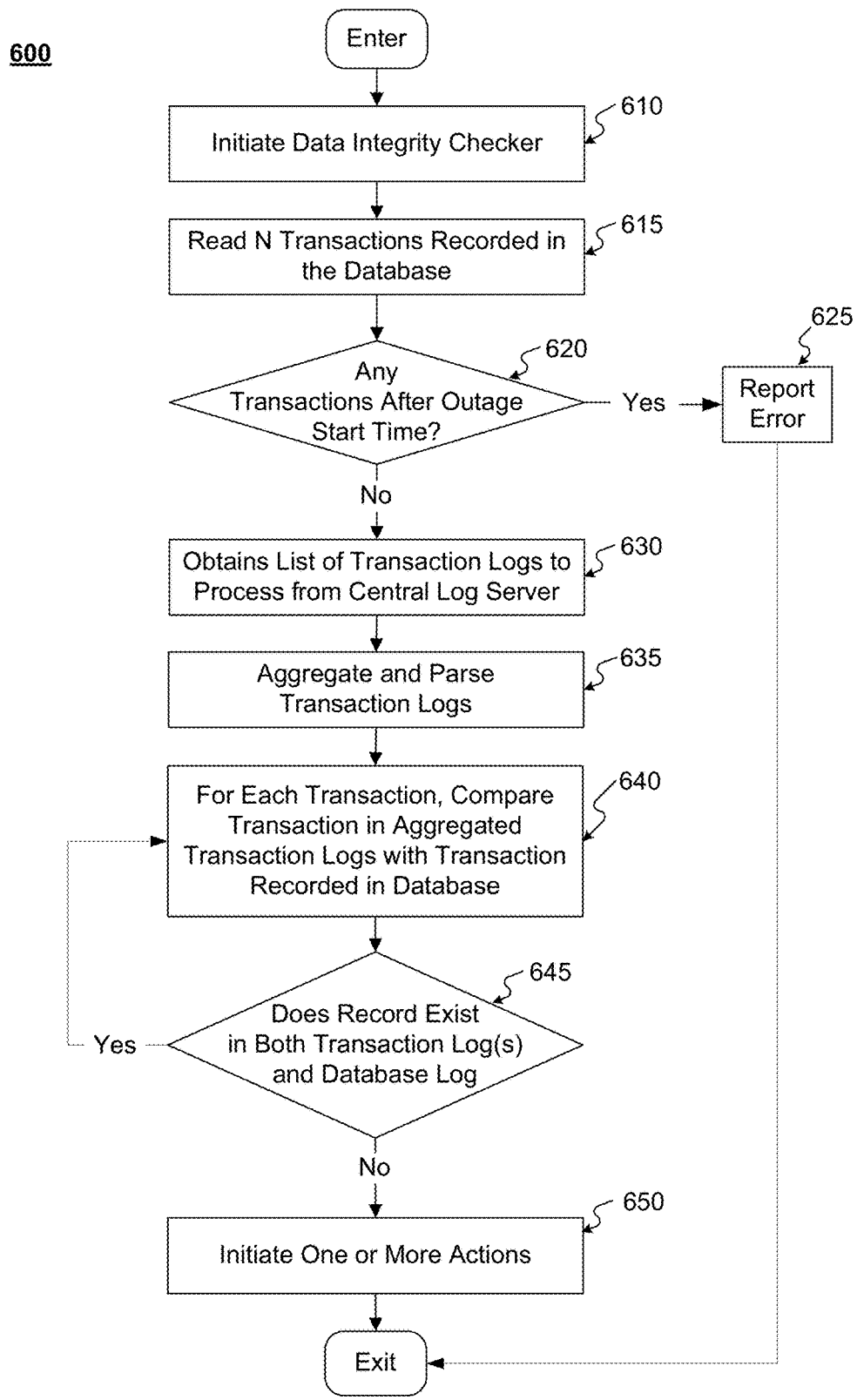
FIG. 6 is a flowchart illustrating a method for performing data integrity checking in an example computing system, consistent with certain disclosed embodiments.

FIG. 6 is an exemplary flowchart 600 illustrating data integrity checking in an exemplary computing system, such as computing system 100, in accordance with certain implementations. Specifically, FIG. 6 illustrates a flowchart 600 consistent with example implementations of the present disclosure in which data integrity checker 416 performs data integrity checking.

As shown in FIG. 6, data integrity checking may be initiated (step 610). Data integrity checking may be initiated manually and/or automatically. In one embodiment, data integrity checking may be initiated automatically, such as, during a system outage (i.e., "during outage" mode) or after an outage has ended (i.e., "after outage" mode). In other embodiments, data integrity checking may be initiated manually, such as, for example, following a planned system outage or a datacenter swing (i.e., transfer of processing from one datacenter to another datacenter).

Next, data integrity checker 416 may read the top N transactions from transactions recorded in database 130 (step 615).

The top N transactions recorded in database 130 may be sorted according to SCN. If data integrity checker 416 determines that any transactions have a timestamp that is after the start of the outage and before an outage end time or if a connection to database 130 is not available (step 620, Yes), data integrity checker 416 may generate an error (step 625) and exit.

If data integrity checker 416 has determined that all transaction time stamps occur before the start of the outage and after an outage end time (step 620, No), log collector 412 may obtain the list of transaction logs 414 to process from central log server 110 (step 630). In one example embodiment, transaction logs 414 may be continuously streamed to central log server 110 in near real-time, so that the data integrity checking can be done more quickly.

Log collector 412 may process the obtained transaction logs 424 to generate aggregated transaction logs 424 (step 635). In some embodiments, processing transaction logs 424 may include confirming that all transaction logs 424 are current. For example, data integrity checker 416 may determine that a data records is not capable of being reliably verified when the transaction start time is later than the specified outage start time parameter value. If there are transactions having a transaction start time after the outage start time, data integrity checker may report an error and stop execution. Processing transaction logs 424 may also include sorting the transaction records. In one exemplary embodiment, aggregated transaction logs 414 may be sorted according to system change number (SCN) and/or transaction identification (ID) number. The SCN may be a unique number that is assigned to and incremented for each transaction that is committed to database 130. The SCN and transaction ID for any given transaction will be the same in a transaction log 424 and its corresponding transactions recorded in database 130.

FIG. 7a illustrates an example of a buffer sorted sequentially according to SCN, and FIGS. 7b and 7c illustrate examples of buffers that are out of order and may be subject to sorting. The buffers illustrated in FIGS. 7a, 7b, and 7c may be buffers associated with aggregated transaction logs 414 and/or transactions recorded in database 130. In the example of FIG. 7a, the top SCN is 500, and the remaining SCNs are listed in reverse sequential order. In FIG. 7b, the tope SCN is also 500, but the list of SCNs is out of order because SCN 400 does not appear between SCN 401 and SCN 399. Instead, SCN 400 appears in FIG. 7b below SCN 300. In FIG. 7c, the highest SCN is 500; however, the top SCN is 400. That is, the SCN appearing at the top of the buffer illustrated in FIG. 7c is not the highest numerical SCN because the buffer is out of order. As discussed above in connection with FIG. 6, step 625, data integrity checker 414 may sort out of order buffers, such as those buffers illustrated in FIGS. 7b and 7c, placing the records in numerical order according to SCN.

Data integrity checker 416 may read aggregated transaction logs 414 to identify N number of top sorted SCNs for comparison (step 640). In one implementation, the N number of top SCNs for comparison may be set to 100. However, the N number of top SCNs for comparison may be any suitable value. If the logical SCN in the first line of aggregated transaction logs 414 is greater than the top SCN of transactions recorded in database 130 less N (i.e., SCN>DBTopSCN−N), then data integrity checker may read the previous day and current day aggregated transaction logs 414. If, however, the logical SCN found in the first line of aggregated transaction logs 414 is not greater than the top SCN of transactions recorded in database 130 less N (i.e., SCN≤DBTopSCN−N), then data integrity checker may read the current day aggregated transaction logs 414. In some embodiments, if not all aggregated transaction logs 414 are readable, data integrity checker 416 may report an error and exit. In other embodiments, if any one or more transaction log records are not readable due, for example, to a parsing error, data integrity checker 416 may ignore the transaction log record, report an error, and continue reading other transaction log records.

Next, data integrity checker 416 may compare the data records in aggregated transaction logs 414 with the transactions recorded in database 130 (step 645).

In some embodiments, comparison of data records between transaction logs 414 and transactions recorded in database 130 may be made based on a transaction ID. For example, data integrity checker 416 may identify a data record in the transaction log 414 having a particular transaction ID and identify a transaction recorded in database 130 having the same transaction ID. Alternatively and/or additionally, comparison of data between transaction logs 414 and transactions recorded in database 130 may also be performed using the SCN in a similar manner as for the transaction ID. When comparing transactions from transaction logs 414 and transactions recorded in database 130, all transactions that are between the top SCN to the top SCN−N may be considered. Thus, for example, if there is only one transaction between top SCN and the top SCN−N, then only one transaction may be compared.

If a data record in aggregated transaction logs 414 having the same transaction ID as a transaction recorded in database 130 exists (step 645, Yes), then the data record is deemed to be present and the process moves to the next data record (step 640). However, if a particular data record exists in aggregated transaction logs 414 but is absent from the transactions recorded in database 130 (step 645, No), then data integrity checker 416 may initiate one or more actions (step 650). If a particular data record is absent from aggregated transaction logs 414 (step 645, No), then data integrity checker 416 may also initiate one or more actions (step 650). And, if both aggregated transaction logs 414 and the transactions recorded in the database 130 reflect missing data records (step 645, No), then data integrity checker 416 may again initiate one or more actions (step 650).

Generating one or more actions (step 650) may include, for example, generating one or more error reports or logs, generating one or more entries in preexisting error reports or logs, generating one or more messages, generating one or more alerts, initiating repair of missing data, etc. In some embodiments, an error report may include, for example, a transaction time for the top SCN in aggregated transaction logs 414, a transaction time for the top SCN of the transactions recorded in database 130, a difference in a number of SCNs between aggregated transaction logs 414 and transactions recorded in database 130, a list of the N number of transactions starting from the lowest SCN in aggregated transaction logs 414 and/ or transactions recorded in database 130, etc.

In one example embodiment, data integrity checker 416 may create a report file for discrepancies in aggregated transaction logs 414 and a separate report file for discrepancies identified in the transactions recorded in database 130. The transaction log discrepancy report file 520a may contain a list of transaction data records that are missing from database 130, whereas the transactions recorded in database discrepancy report 520b may contain a list of transaction data records that are missing from aggregated transaction logs 414. When there are no transaction data records missing from database 130, the transaction log discrepancy report file 520a may contain no information. Similarly, when there are no transaction data records missing from aggregated transaction logs 414, the database discrepancy report file 520*b* may contain no information.

In some embodiments, one or more additional log files may be generated, and these additional log files may be used to report information that is logged under other circumstances, such as normal operating conditions and/or error conditions. For example, the additional log files may include information, such as, a total number of data records checked in aggregated transaction logs 414, a total number of data records checked of the transactions recorded in database 130, a count of the number of data records determined to be missing from aggregated transaction logs 414, a count of the number of data records determined to be missing from the transactions recorded in database 130, a date and/or timestamp from aggregated transaction logs 414, a date and/or timestamp from transactions recorded in database 130, etc.

Figure 8A:
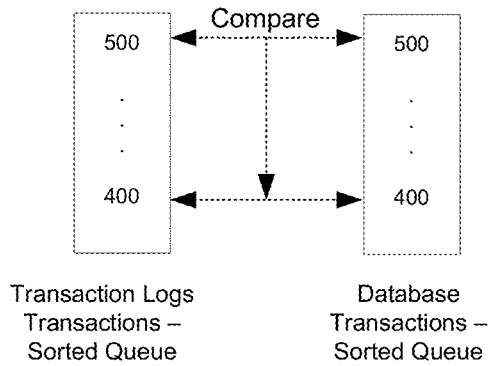
FIG. 8a illustrates an example embodiment of data integrity checking, consistent with certain disclosed embodiments.

FIGS. 8*a*-8*e* each illustrate examples of comparison between sorted transaction logs 414 and transactions recorded in database 130, as discussed above in connection with FIG. 6, step 645. FIG. 8*a* illustrates an example of a comparison in which there is no data loss. That is, in FIG. 8*a*, each of the N number of transaction data records being compared are found to be the same between aggregated transaction logs 414 and the transactions recorded in database 130.

Figure 8B:
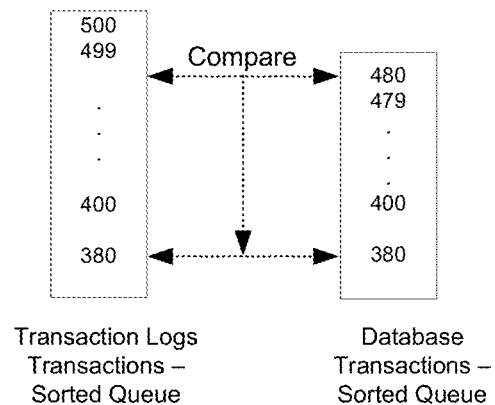
FIG. 8b illustrates an example embodiment of data integrity checking, consistent with certain disclosed embodiments.

FIGS. 8*b*-8*e* each illustrate examples where there is a data loss and/or data mismatch between aggregated transaction logs 414 and transactions recorded in database 130. In FIG. 8*b*, aggregated transaction logs 414 have a top SCN of 500, while transactions recorded in database 130 have a top SCN of 480. Thus, while there may be no discrepancies when comparing transactions data records SCN 480 through SCN 380, data integrity checker 416 may determine that, of the transactions recorded in database 130, SCN 500 through SCN 481 are missing. Thus, data integrity checker 416 may take one or more actions in response to the missing data, as discussed above in connection with FIG. 6, step 655. For example, data integrity checker 416 may log the missing transaction data records of aggregated transaction logs 414 to a file.

Figure 8C:
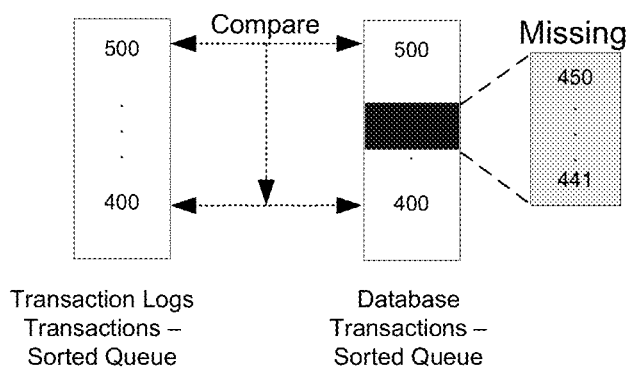
FIG. 8c illustrates an example embodiment of data integrity checking, consistent with certain disclosed embodiments.

In FIG. 8*c*, both aggregated transaction logs 414 and the transactions recorded in database 130 have a top SCN of 500. In aggregated transaction logs 414, the transaction data records continue from SCN 500 in reverse sequential order to SCN 400. However, of the transactions recorded in database 130, SCN 450 through SCN 441 are missing. Therefore, data integrity checker 416 may determine that there is a discrepancy between aggregated transaction logs 414 and the transactions recorded in the database 130, and data integrity checker 416 may take one or more actions in response to the missing data, as discussed above in connection with FIG. 6, step 655. For example, data integrity checker 416 may log the transaction data records missing from database 130 to a file.

Figure 8D:
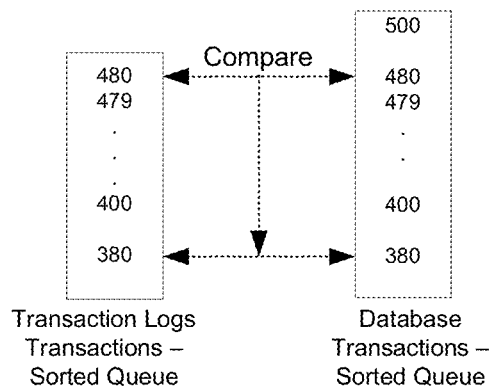
FIG. 8d illustrates an example embodiment of data integrity checking, consistent with certain disclosed embodiments.

In FIG. 8*d*, aggregated transaction logs 414 have a top SCN of 480, while the transactions recorded in database 130 have a top SCN of 500. In the example of FIG. 8*d*, while there may be no discrepancies when comparing transactions data records SCN 480 through SCN 380, aggregated transaction logs 414 may be missing SCN 500 through SCN 481. In some embodiments, when run in "during outage" mode, data integrity checker 416 may be unable to determine statistically whether or not data loss has occurred in the example of FIG. 8*d*. Therefore, once the transaction logs 424 are recovered, data integrity checker 416 may be initiated in "after outage" mode and the process of FIG. 6 may be repeated.

Figure 8E:
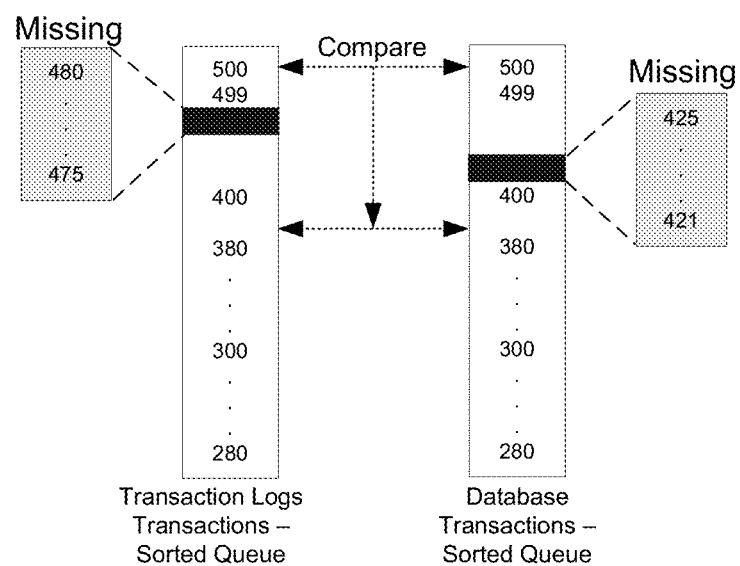
FIG. 8e illustrates an example embodiment of data integrity checking, consistent with certain disclosed embodiments.

In FIG. 8*e*, both aggregated transaction logs 414 and the transactions recorded in database 130 have a top SCN of 500. In aggregated transaction logs 414, the transaction data records continue from SCN 500 in reverse sequential order to SCN 400 with a gap between SCN 480 and SCN 475. Thus, in aggregated transaction logs 414, SCN 480 through SCN 475 may be determined to be missing. In the transactions recorded in database 130, the transaction data records continue from SCN 500 in reverse sequential order to SCN 400 with a gap between SCN 425 and SCN 421. Thus, of the transactions recorded in database 130, SCNs 425 through 421 may be determined to be missing. Therefore, data integrity checker 416 may determine that there are discrepancies in both aggregated transaction logs 414 and the transactions recorded in database 130, and data integrity checker 416 may take one or more actions in response to the missing data, as discussed above in connection with FIG. 6, step 655. For example, data integrity checker 416 may write the transaction data records missing from aggregated transaction logs 414 to a first file, and write the transaction data records missing from database 130 to a second file.

In the disclosed embodiments, data integrity checker 416 may capture the latest set of transactions and ensure that these match the latest records in database 130 to ensure zero data loss after a computer system outage. In the event that components of a computer system were not shut down gracefully, data integrity checker 416 may compare two distinct data sets to identify data loss in the system. These two data points will be the transaction logs created by the application servers and the transactions recorded in the database for the database. While the disclosed embodiments illustrate implementations in connection with a system outage, data integrity checker 416 may be initiated at any time to assure that the database is up-to-date.

It is intended, therefore, that the specification and examples be considered as exemplary only, with a true scope and spirit of the disclosure being indicated by the following claims and their full scope of equivalents.

What is claimed is:

1. A computer-implemented method operating in a computing system for data integrity checking, the method comprising:
receiving, from each of a plurality of computing devices of the computing system, application transaction logs, wherein the application transaction logs are related to a plurality of applications;
comparing, by the central computing device, the received application transaction logs to transactions recorded in a database to identify missing transactions; and performing one or more actions in response to the identified missing transactions,
wherein the performing the one or more actions includes at least one of writing the identified missing transactions to an error report, writing the identified missing transactions to a log file, and repairing the identified missing transactions and wherein requesting the application transaction logs is initiated during an outage and before opening the computing system to traffic.

2. The computer-implemented method of claim 1, further including:
storing, on the central computing device, the received application transaction logs.

3. The computer-implemented method of claim 1, further including:
sorting, by the central computing device, the received application transaction logs.

4. The computer-implemented method of claim 1, further including:

aggregating, by the central computing device, the received application transaction logs.

5. A computing system for data integrity checking, the system comprising:
   at least one memory to store data and instructions; and
   at least one processor configured to access memory and to execute instructions to:
      receive, from each of a plurality of computing devices of the computing system, application transaction logs, wherein the application transaction logs are related to a plurality of applications;
      compare, by the central computing device, the received application transaction logs to transactions recorded in a database to identify missing transactions; and
      perform one or more actions in response to the identified missing transactions,
   wherein when the at least one processor is configured to perform the one or more actions, the at least one processor is further configured to perform at least one of writing the identified missing transactions to an error report, writing the identified missing transactions to a log file, and repairing the identified missing transactions and wherein the at least one processor is configured to request the application transaction logs during an outage and before opening the computing system to traffic.

6. The computing system of claim 5, wherein the at least one processor is further configured to:
   store, on the central computing device, the received application transaction logs.

7. The computing system of claim 5, wherein the at least one processor is further configured to:
   sort, by the central computing device, the received application transaction logs.

8. The computing system of claim 5, wherein the at least one processor is further configured to:
   aggregate, by the central computing device, the received application transaction logs.

9. A computer-implemented method operating in a computing system for data integrity checking, the method comprising:
   receiving, from each of a plurality of computing devices of the computing system, application transaction logs, wherein the application transaction logs are related to a plurality of applications;
   aggregating, by the central computing device, the received application transaction logs to generate aggregated transaction logs;
   reading, by the central computing device, transactions recorded in a database;
   comparing, by the central computing device, the aggregated transaction logs to the transactions recorded in the database to identify one or more missing transactions; and
   performing one or more actions in response to the identified missing transactions,
   wherein the performing the one or more actions includes at least one of writing the identified missing transactions to an error report, writing the identified missing transactions to a log file, and repairing the identified missing transactions and wherein requesting the application transaction logs is initiated during an outage and before opening the computing system to traffic.

10. The computer-implemented method of claim 9, further including:
   storing, on the central computing device, the received application transaction logs.

11. The computer-implemented method of claim 9, further including:
   sorting, by the central computing device, the received application transaction logs.

12. A computer-implemented method operating in a computing system for data integrity checking, the method comprising:
   receiving, from each of a plurality of computing devices of the computing system, application transaction logs, wherein the application transaction logs are related to a plurality of applications;
   comparing, by the central computing device, the received application transaction logs to transactions recorded in a database to identify missing transactions; and
   performing one or more actions in response to the identified missing transactions,
   wherein the performing the one or more actions includes at least one of writing the identified missing transactions to an error report, writing the identified missing transactions to a log file, and repairing the identified missing transactions and wherein requesting the application transaction logs is initiated after an outage and after opening the computing system to traffic.

13. A computing system for data integrity checking, the system comprising:
   at least one memory to store data and instructions; and
   at least one processor configured to access memory and to execute instructions to:
      receive, from each of a plurality of computing devices of the computing system, application transaction logs, wherein the application transaction logs are related to a plurality of applications;
      compare, by the central computing device, the received application transaction logs to transactions recorded in a database to identify missing transactions; and
      perform one or more actions in response to the identified missing transactions,
   wherein when the at least one processor is configured to perform the one or more actions, the at least one processor is further configured to perform at least one of writing the identified missing transactions to an error report, writing the identified missing transactions to a log file, and repairing the identified missing transactions and wherein the at least one processor is configured to request the application transaction logs after an outage and after opening the computing system to traffic.

14. A computer-implemented method operating in a computing system for data integrity checking, the method comprising:
   receiving, from each of a plurality of computing devices of the computing system, application transaction logs, wherein the application transaction logs are related to a plurality of applications;
   aggregating, by the central computing device, the received application transaction logs to generate aggregated transaction logs;
   reading, by the central computing device, transactions recorded in a database;
   comparing, by the central computing device, the aggregated transaction logs to the transactions recorded in the database to identify one or more missing transactions; and
   performing one or more actions in response to the identified missing transactions,
   wherein the performing the one or more actions includes at least one of writing the identified missing transactions to an error report, writing the identified missing transactions to a log file, and repairing the identified missing transactions and wherein requesting the application transaction logs is initiated after an outage and after opening the computing system to traffic.

* * * * *